United States Patent
Elms et al.

(10) Patent No.: US 8,991,426 B2
(45) Date of Patent: Mar. 31, 2015

(54) APPARATUS AND METHOD FOR FLUID CONTROL

(71) Applicant: Haven Technology Solutions LLC, Magnolia, TX (US)

(72) Inventors: David J. Elms, Magnolia, TX (US); Gregory A. Hudspeth, Amarillo, TX (US)

(73) Assignee: Haven Technology Solutions LLC, Magnolia, TX (US)

( * ) Notice: Subject to any disclaimer, the term of this patent is extended or adjusted under 35 U.S.C. 154(b) by 0 days.

(21) Appl. No.: 13/917,341

(22) Filed: Jun. 13, 2013

(65) Prior Publication Data

US 2014/0366971 A1  Dec. 18, 2014

(51) Int. Cl.
*F16K 11/085* (2006.01)
*F16K 11/00* (2006.01)

(52) U.S. Cl.
CPC ..................................... *F16K 11/00* (2013.01)
USPC ................. 137/625.47; 137/118.02; 137/172; 137/625.48; 210/97; 210/540

(58) Field of Classification Search
USPC ........... 137/118.02, 154, 172, 561 A, 625.16, 137/625.18, 625.19, 625.32, 625.47, 137/625.48, 872, 875, 876, 887; 210/97, 210/104, 137, 540
See application file for complete search history.

(56) References Cited

U.S. PATENT DOCUMENTS

| | | | | | |
|---|---|---|---|---|---|
| 800,125 | A | * | 9/1905 | Beresford | 137/625.16 |
| 1,343,490 | A | * | 6/1920 | Albertson | 137/625.47 |
| 1,623,248 | A | * | 4/1927 | Joseph et al. | 137/625.32 |
| 1,905,733 | A | * | 4/1933 | Moore | 137/101 |
| 2,252,141 | A | * | 8/1941 | Seidel et al. | 137/625.48 |
| 2,782,739 | A | * | 2/1957 | Freer | 111/119 |
| 3,489,178 | A | * | 1/1970 | Kice | 406/183 |
| 3,680,468 | A | * | 8/1972 | Schueler | 454/324 |
| 3,743,460 | A | * | 7/1973 | Woolridge | 425/133.5 |
| 3,802,825 | A | * | 4/1974 | Upmeier | 425/378.1 |
| 4,046,166 | A | * | 9/1977 | Bender | 137/625.48 |
| 4,190,082 | A | * | 2/1980 | Hernandez Crespo | 137/625.17 |
| 4,566,494 | A | * | 1/1986 | Roche | 137/872 |
| 5,097,969 | A | * | 3/1992 | Maxworthy | 211/153 |
| 5,165,450 | A | * | 11/1992 | Marrelli | 137/875 |
| 5,251,662 | A | * | 10/1993 | Rubel et al. | 137/875 |
| 5,368,072 | A | * | 11/1994 | Cote | 137/872 |
| 5,569,252 | A | * | 10/1996 | Justin et al. | 606/916 |

* cited by examiner

*Primary Examiner* — John Fox

(57) ABSTRACT

A multi-phase separation flow management apparatus has a housing with an inlet, a first outlet and a second outlet and in which a movable element is mounted. The movable element has a first passageway with an inlet and an outlet and a second passageway having an inlet and an outlet, and are disposed in the element so that the inlets of the first and second passageways are adjacent one another and the outlets of the first and second passageways are spaced apart from one another. The inlets are disposed adjacent a housing inlet, the first passageway outlet is disposed adjacent a first housing outlet and the second passageway outlet is disposed adjacent a second housing outlet.

20 Claims, 6 Drawing Sheets

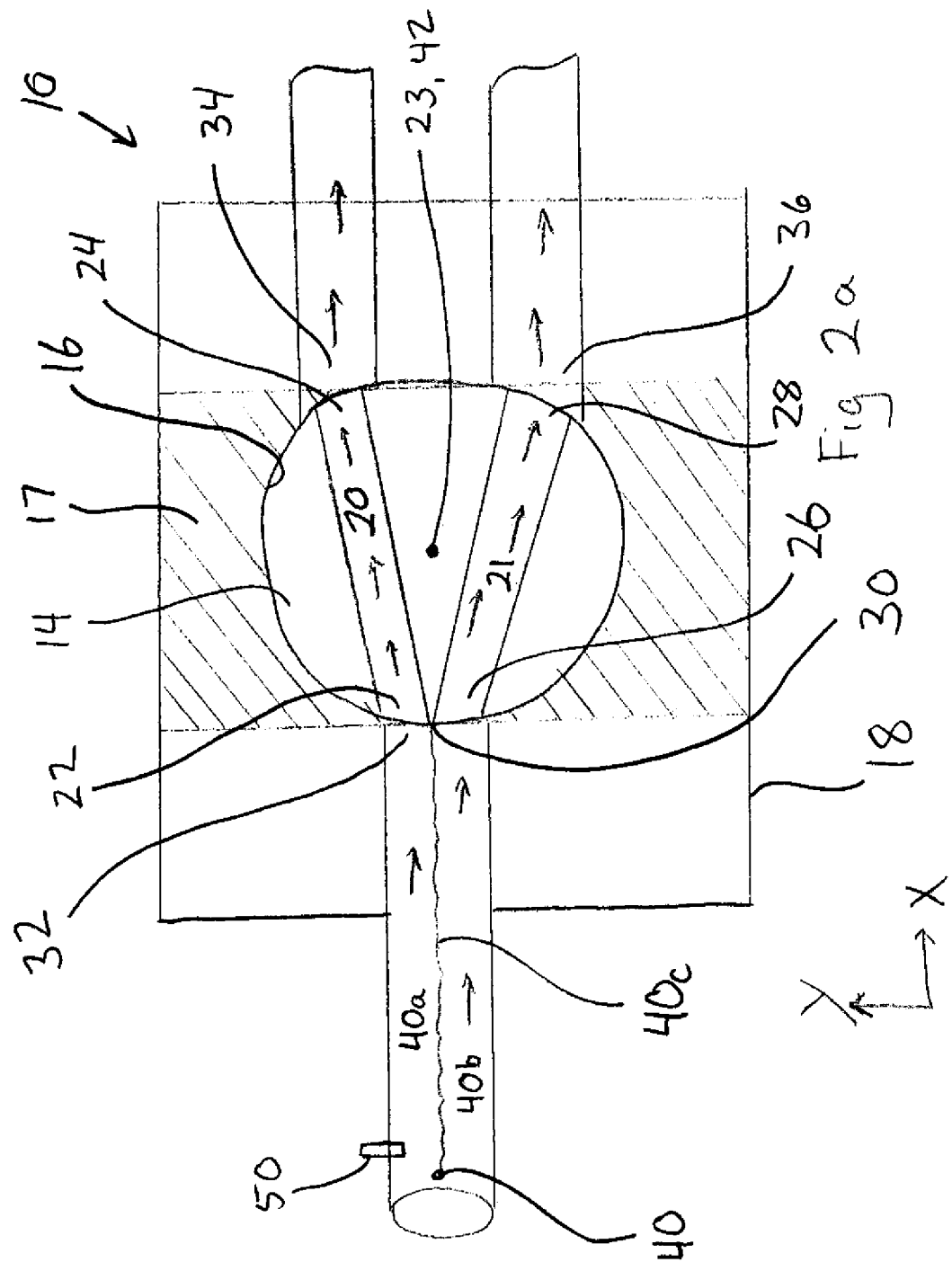

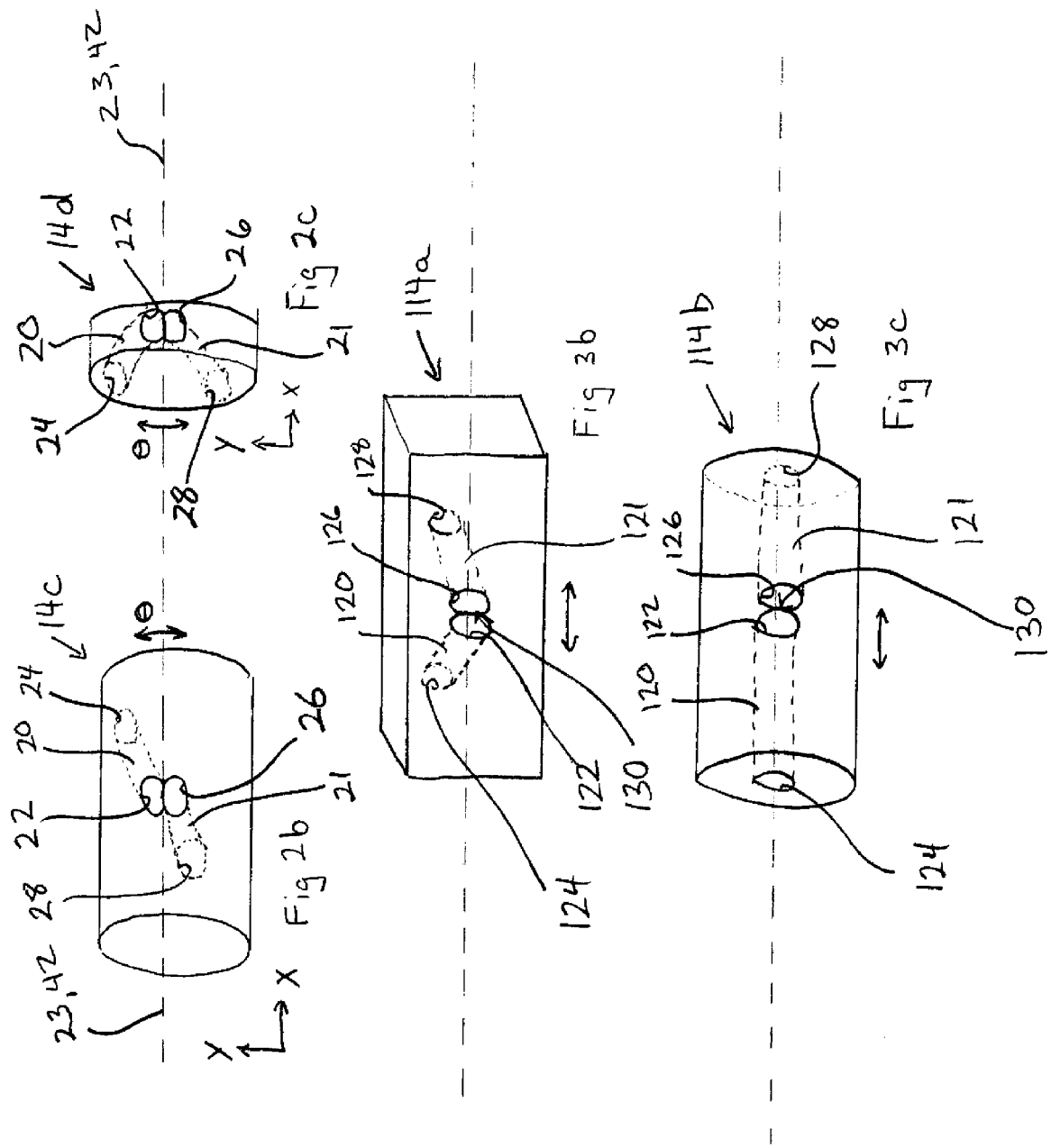

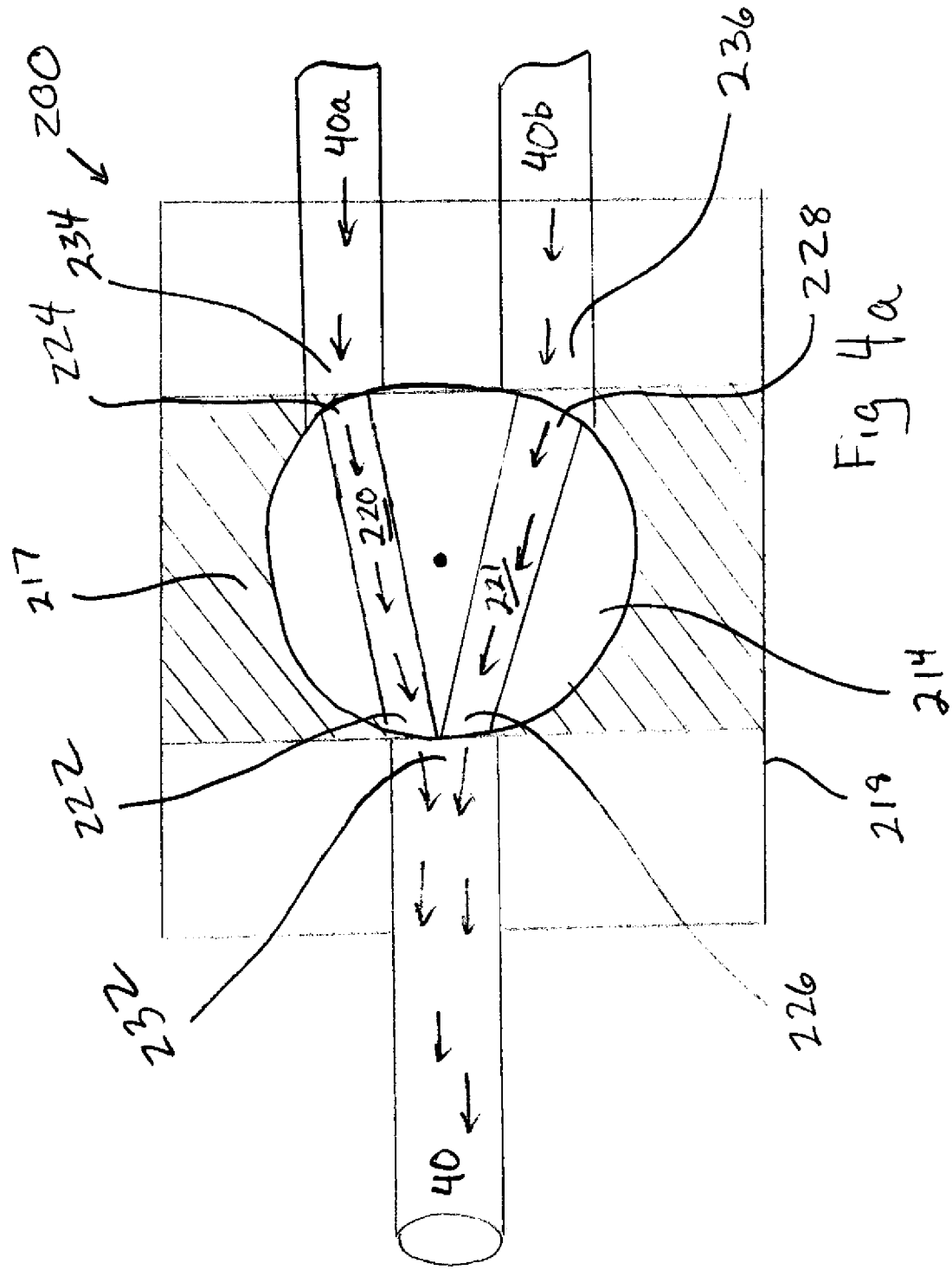

APPARATUS AND METHOD FOR FLUID CONTROL

FIELD OF THE INVENTION

The present invention generally relates to the separation of components in a multi-phase flow stream. More specifically, it relates to a valve that can be used to alter the cut of fluids passing therethrough.

BACKGROUND OF THE INVENTION

A multi-component flow stream include a mixture of different fluids which may have different phases, such as air and water, steam and water, or oil and natural gas, or the same phase, such as liquid water and oil. It is often desirable to separate or otherwise manage these flow streams. In the prior art, such separation is commonly accomplished utilizing a phase separator utilizing a weir plate or foil disposed within a flow stream to divert a portion of the flow. It would be desirable to provide an improved system to manage the flow of multi-component and or multi-phase streams, such as for example, separating two liquid components of a flow stream.

SUMMARY OF THE INVENTION

The invention relates to a valve having an adjustable element with at least two flow passages or channels defined in the adjustable element. In one aspect of the invention, the valve is used to separate components of a stratified flow stream. In such case, the channels intersect one another to form a leading edged adjacent an inlet flow port through which the steam is flowing. Movement of the adjustable element alters the positions of the flow passages relative to a flow port, permitting the leading edge to be positioned in the flow steam at the stratification boundary between the components of the flow stream, such that one component passes through a first channel and the second component passes through a second channel. In one embodiment, the adjustable element may be a cylinder or block that can be linearly translated in order to alter the position of the flow passages relative to the flow port. In another embodiment, the adjustable element may be angularly rotatable to alter the relative positions. In one embodiment, the adjustable element may be a rotatable cylinder having two flow passages therethrough. Rotation of the cylinder adjust the positions of the flow passages relative to a liquid-liquid flow stream, exposing more or less of a particular passage to the flow steam.

The invention therefore allows a multi-phase and/or multi-component fluid to be effectively separated with the valve of the disclosure.

The valve may also be utilized to mix two fluids together by adjusting the relative amounts of two fluid components that comprise a fluid flow stream. In such case, separate fluid components are introduced into the flow passages and are merged together into a single flow stream at the leading edge of the adjustable element. In such case, the adjacent flow port functions as a fluid outlet. The relative components of the flow stream in the fluid outlet can be controlled by movement of the adjustable element.

BRIEF DESCRIPTION OF THE DRAWINGS

A more complete understanding of the present disclosure and advantages thereof may be acquired by referring to the following description taken in conjunction with the accompanying figures, wherein:

FIG. 1b illustrates a three-dimensional view of a block than can translate in the valve housing of FIG. 1a.

FIG. 1c illustrates a three-dimensional view of a cylinder than can translate in the valve housing of FIG. 1a.

FIG. 2a illustrates a cross-sectional side view of an embodiment of an adjustable valve used as a fluid-fluid phase splitter in which the moveable element is a cylinder or disk that rotates about a horizontal axis.

FIG. 2b illustrates a three-dimensional view of a cylinder than can rotate in the valve housing of FIG. 2a.

FIG. 2c illustrates a three-dimensional view of a circular disk than can rotate in the valve housing of FIG. 2a.

FIG. 3b illustrates a three-dimensional view of a block than can linearly translate in the valve housing of FIG. 3a.

FIG. 3c illustrates a three-dimensional view of a cylinder than can linearly translate in the valve housing of FIG. 3a.

FIG. 4a illustrates a cross-sectional top view of an embodiment of an adjustable valve used as a fluid-fluid mixer in which the moveable element is a disk that axially rotates.

FIG. 4b illustrates a three-dimensional view of a circular disk than can rotate in the valve housing of FIG. 4a.

DETAILED DESCRIPTION

In the detailed description of the invention, like numerals are employed to designate like parts throughout. Various items of equipment, such as pipes, valves, pumps, fasteners, fittings, etc., may be omitted to simplify the description. However, those skilled in the art will realize that such conventional equipment can be employed as desired.

Figure 1A:
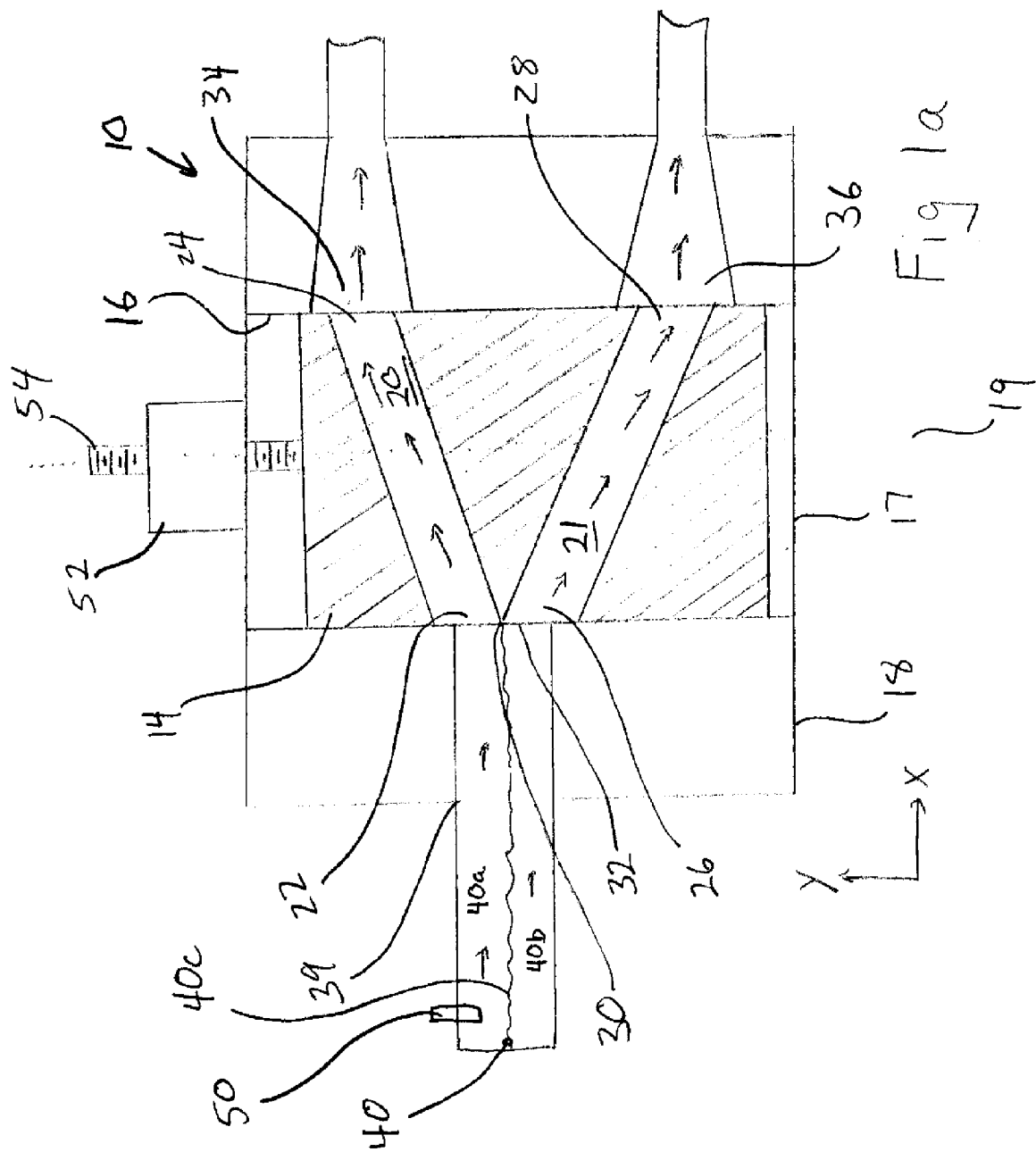
FIG. 1a illustrates a cross-sectional side view of an embodiment of an adjustable valve used as a fluid-fluid phase splitter in which the moveable element is a block or cylinder that translates along a vertical axis.
Figure 1C:
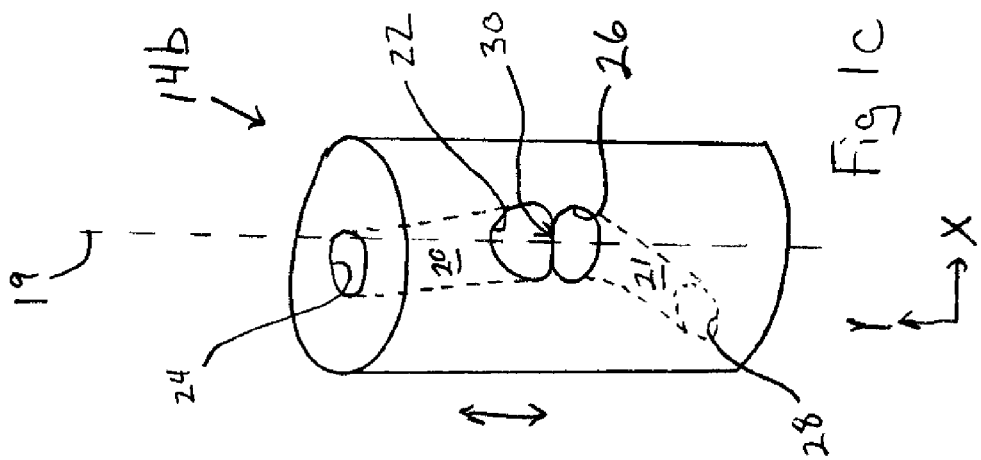
Figure 1B:
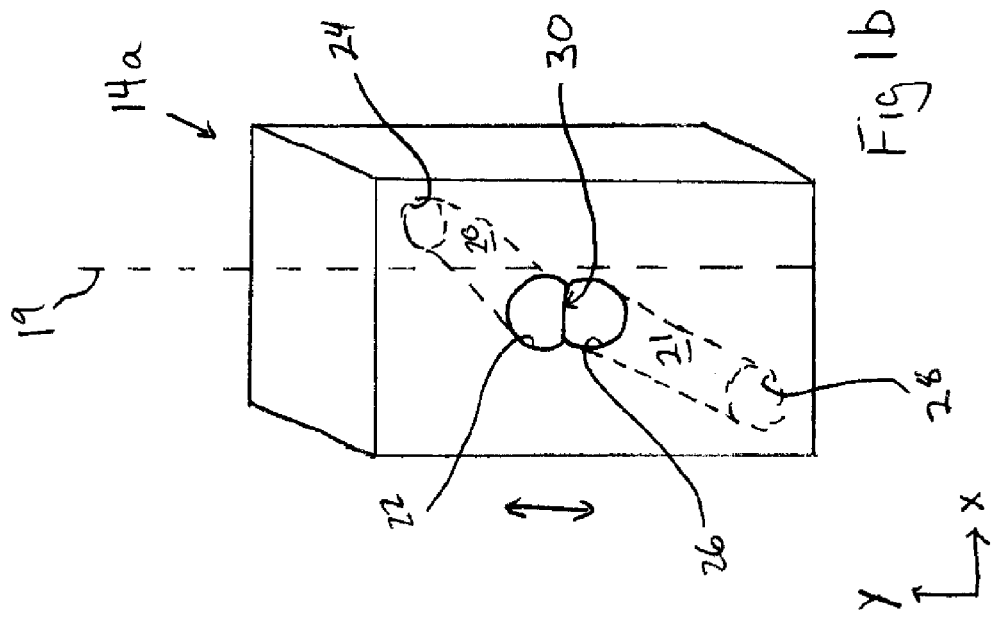

FIGS. 1a-1c illustrate one embodiment of a valve 10 having an adjustable valve element 14 positioned where valve 10 can function as a fluid-fluid phase splitter as described below. Movable valve element 14 is mounted to translate in a valve bore 16 defined within a valve housing 18 to form a valve seat 17. Movable element 14 includes a first passageway 20 having a first passage port 22 and a second passage port 24, as well as a second passageway 21 having a third passage port 26 and a forth passage port 28. As will be explained below, for the embodiments illustrated in FIGS. 1a-1c, bore 16 is preferably vertically oriented as illustrated by vertical axis 19.

FIG. 1b illustrates movable valve element 14 as a slidable block 14a, while FIG. 1c illustrates movable valve element 14 as a slidable cylinder 14b. Block 14 may have a cross-section that is square, rectangular, triangular or of another shape so long as it is translatable in a bore 16 as described herein. Preferably, bore has a corresponding cross-sectional shape to permit linear translation therein by block 14. In any case, passageways 20, 21 are formed in element 14 so that ports 22, 26 are adjacent one another, while ports 24, 28 are spaced apart from one another. In one embodiment, passageways 20, 21 converge at ports 22, 26 so that a portion of valve element 14 defining passageways 20, 21 forms an edge 30. Edge 30 is preferably substantially horizontally disposed. Valve housing 18 includes a first housing port 32, a second housing port 34 and a third housing port 36. In certain embodiments, first housing port 32 is a fluid inlet, while second housing port 34 and third housing port 36 are first and second fluid outlets. Valve element 14 is disposed in bore 16 so that the passage ports 22, 26 are adjacent housing port 32, second passage port 24 is in fluid communication with second housing port 34 and fourth passage port 28 is in fluid communication with third housing port 36. In a preferred embodiment, edge 30 is positioned adjacent first housing port 32. Actuation of element 14 thereby adjusts the position of edge 30 and hence the fluid stream flowing through the ports.

The invention is not limited to any particular shape of the ports or passageways described herein, nor the placement of the passageways within the valve element 14 other than to ensure the convergence and divergence as described herein. For example, for linearly translatable elements, the passageways may be defined along the axis of the moveable element so that a port is defined in each end of the element (see for example, FIG. 3c). Likewise, the passageways may extend linearly through the element to the opposite side of the element.

In particular, for use as a phase separator, it is desirable that the incoming fluid at first housing port 32 is horizontally stratified. Persons of ordinary skill in the art will appreciate that this stratification is desirably achieved by gravitational effects acting on the different density or weighted components of the incoming fluid stream. Thus, it is desirable that the first housing port 32 is in fluid communication with a substantially horizontal flow passage 39. In this way, valve 12 can be adjusted by vertically translating valve element 14 within bore 16 to alter the cut of a fluid steam passing there through. Specifically, edge 30 can be moved up or down so as to position it at the boundary between the stratified fluid stream. Although not limited to particular components of a fluid stream, the valve 10 is particularly useful for liquid-liquid flow streams. For example, valve 12 can be adjusted to alter the cut of liquid stream 40 such that a portion of the liquid 40a flows through first passageway 20 and a portion of the liquid 40b flows through the second passageway 21. As shown, liquid stream 40 is stratified to form a boundary 40c between liquid 40a and liquid 40c. Persons of ordinary skill in the art will understand that passageways 20, 21, and their respective ports 22, 26 may be sized so that valve 12 may also be adjusted to divert all of liquid 40 flowing though housing port 32 into either first or second passageway 20, 21, as desired.

A sensor 50 may be placed upstream of the valve 10 in order to estimate the cut of the components within the fluid stream, and hence the position of the stratification boundary, thereby permitting moveable element 14 to be adjusted as desired. Any type of sensor disposed for making such measurements may be used.

Persons of ordinary skill in the art will appreciate that any type of actuation mechanism 52 can be used to move element 14 within bore 16, such as an electric motor or hydraulic motor. In the illustrated embodiment, actuation mechanism 52 is a motor that drives a screw 54 to move element 14. In other embodiments, element 14 can be manually positioned. In the case of a motor 52, sensor 50 may be used to actuate the motor 52 as desired in a control loop.

With reference to FIGS. 2a-2c, a moveable element 14 may be a rotatable, elongated cylinder 14c mounted in valve housing 18 as shown in FIG. 2b or a rotatable disk 14d as shown in FIG. 2c. In this embodiment, bore 16 of valve seat 17 is preferably horizontally oriented as illustrated by horizontal axis 23, and the cylinder 14c is positioned therein to rotate about a horizontally defined cylinder axis 42 to adjust the positions of passage ports 22, 26 with respect to housing port 32. Cylinder 14c is angularly rotated about the axis 42 in order to adjust the leading edge 30 relative to housing port 32. As with the first embodiments described in FIGS. 1a-1c, the embodiments illustrated in FIGS. 2a-2b are particularly useful with gravitationally stratified flow regimes or flow streams, particularly when the flow stream is comprised of at least two liquid components that can be stratified to form a boundary to which the edge 30 can be adjusted.

While the embodiments of valve 10 described above are particularly useful as phase separators, the embodiments may also be used to mix separate fluid components 40a and 40b into a single fluid stream 40. In such case, a first fluid component 40a may be introduced into first passageway 20 and a second fluid component 40b may be introduced into second passageway 21. The two fluid components are combined at edge 30 and flow through passage 49, such that port 32 is a fluid outlet port. The relative portions of the fluid components 40a, 40b within fluid stream 40 can be controlled by adjustment of movable element 14. In other words, valve 10 may be used to mix fluids.

Figure 3A:
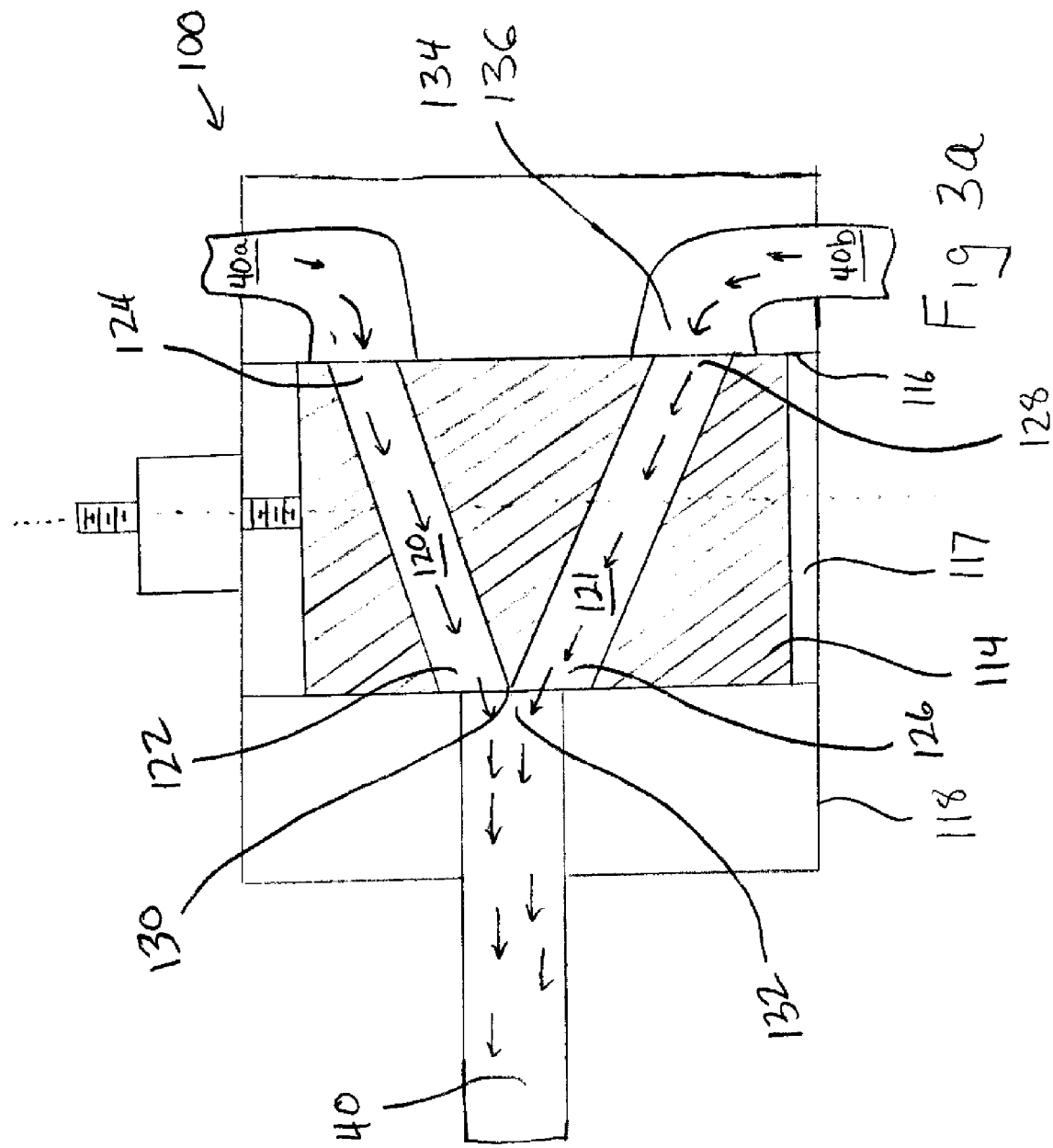
FIG. 3a illustrates a cross-sectional top view of an embodiment of an adjustable valve used as a fluid-fluid mixer in which the moveable element is a block or cylinder that linearly translates.

Turning to FIG. 3a, a top view of a valve 100 having an adjustable valve element 114 is shown. Movable valve element 114 is mounted to translate in a valve bore 116 defined within a valve housing 118 to form a valve seat 117. Movable element 114 includes a first passageway 120 having a first passage port 122 and a second passage port 124, as well as a second passageway 121 having a third passage port 126 and a forth passage port 128. FIG. 3a illustrates the valve inlets and outlets arranged in a T-configuration. Persons of ordinary skill in the art will appreciate that the valves disclosed herein are not limited to a particular configuration with respect to valve housing 18 unless otherwise identified in a specific embodiment. Thus, second and third housing ports 34, 36, for example, may be disposed to exit the valve housing parallel to one another, such as is shown in FIG. 1 a, or opposite one another, such as is shown in FIG. 3a.

FIG. 3b illustrates movable valve element 114 as a slidable block 114a, while FIG. 3c illustrates movable valve element 114 as a slidable cylinder 114b. In either case, with reference to FIG. 3a, passageways 120, 121 are formed in element 114 so that ports 122, 126 are adjacent one another, while ports 124, 128 are spaced apart from one another. In one embodiment, passageways 120, 121 converge at ports 122, 126 so that a portion of valve element 114 defining passageways 120, 121 forms an edge 130. Valve housing 118 includes a first housing port 132, a second housing port 134 and a third housing port 136. In certain embodiments, first housing port 132 is a fluid outlet, while second housing port 134 and third housing port 136 are first and second fluid inlets. Valve element 114 is disposed in bore 116 so that the passage ports 122, 126 are adjacent housing port 132, second passage port 124 is in fluid communication with second housing port 134 and fourth passage port 128 is in fluid communication with third housing port 136. In a preferred embodiment, edge 130 is positioned adjacent first housing port 132. Actuation of element 114 thereby adjusts the position of edge 130 and hence the fluid stream flowing through the ports.

Turning to FIG. 4a, a top view of a valve 200 having an adjustable valve element 214 is shown. Movable valve element 214 is mounted to rotate in a valve seat 217 carried within a valve housing 218. Movable element 214 includes a first passageway 220 having a first passage port 222 and a second passage port 224, as well as a second passageway 221 having a third passage port 226 and a forth passage port 228.

Figure 4B:
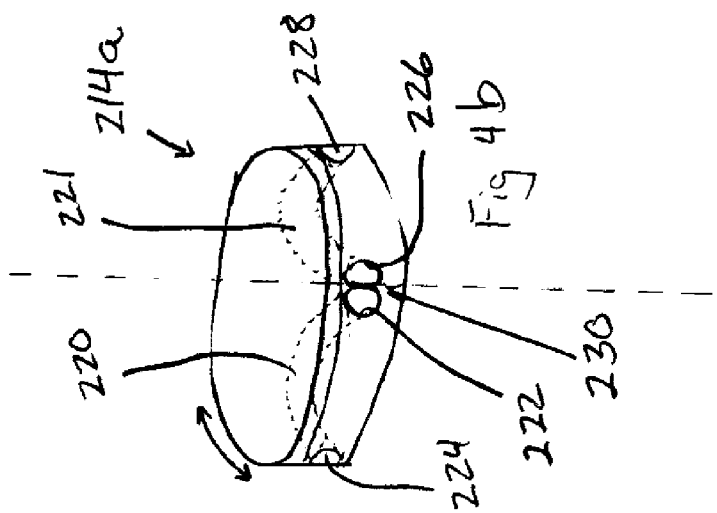

FIG. 4b illustrates movable valve element 214 as a rotatable disk 214a. Passageways 220, 221 are formed in element 214 so that ports 222, 226 are adjacent one another, while ports 224, 228 are spaced apart from one another. In one embodiment, passageways 220, 221 converge at ports 222, 226 so that a portion of valve element 214 defining passageways 220, 221 forms an edge 230. Valve housing 218 includes a first housing port 232, a second housing port 234 and a third housing port 236. In certain embodiments, first housing port 232 is a fluid outlet, while second housing port 234 and third housing port 236 are first and second fluid inlets. Valve element 214 is disposed in seat 217 so that the passage ports 222, 226 are adjacent housing port 232, second passage port 224 is in fluid communication with second housing port 234 and fourth passage port 228 is in fluid communication with third housing port 236. In a preferred embodiment, edge 230 is positioned adjacent first housing port 232. Actuation of element 214 thereby adjusts the position of edge 230 and hence the fluid stream flowing through the ports.

Fluid cut sensors and/or actuation motors as previously described may be utilized with any of the embodiments described herein. In this regard, any mechanism may be used to rotate, translate or otherwise adjust the moveable elements as described herein and the disclosure in not limited in this regard.

Persons of ordinary skill in the art will appreciate that the moveable element 14, whether angularly rotatable or linearly translatable, can be moved to alter the cross-sectional area of the particular passageway exposed to the housing port. As such, the fluids flowing through the ports and passages may be managed as desired. For example, the moveable element may be adjusted based on the cut of a flow stream 40 having first and second liquid components 40a, 40b so that the first and second liquid components can be separately ported. Alternatively, separate fluid components 40a, 40b can be mixed into a single stream 40 utilizing the valve to adjust the relative portions of each component within the stream.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A valve comprising:
a horizontal passageway;
a fluid cut sensor disposed along the horizontal passageway;
a housing having a horizontal inlet in fluid communication with the horizontal passageway, a first outlet and a second outlet; and
a rotatable element rotatably mounted in the housing, the rotatable element rotatable about an axis and having a first passageway with an inlet and an outlet; and a second passageway having an inlet and an outlet, wherein the inlets of the first and second passageways are adjacent one another and the outlets of the first and second passageways are spaced apart from one another, the inlets disposed adjacent the housing inlet, the first passageway outlet disposed adjacent the first housing outlet and the second passageway outlet disposed adjacent the second housing outlet, wherein the first and second passageways converge at their respective inlets to form an edge adjacent the housing inlet, wherein the edge is substantially parallel with the axis of the rotatable element.

2. The valve of claim 1, wherein the edge is substantially horizontal.

3. The valve of claim 1, further comprising a valve seat within the valve housing, the valve seat defining a substantially horizontal cylindrical bore in which the moveable element is disposed, wherein the rotatable element is defined along an axis that is substantially horizontal.

4. The valve of claim 3, wherein the edge is substantially horizontal.

5. The valve of claim 1, wherein the rotatable element is an elongated cylinder.

6. The valve of claim 1, wherein the rotatable element is a disk.

7. A valve comprising:
a fluid cut sensor;
a valve housing having a first port formed by a horizontal flow passage, a second port and a third port; and
a valve element moveably mounted in the housing, the valve element rotatable about an axis and having a first passageway extending between first and second ports of the valve element; and a second passageway extending between third and fourth ports of the valve element, wherein the first and third ports of the first and second passageways, respectively, are adjacent one another and the second and fourth ports of the first and second passageways, respectively, are spaced apart from one another, the first and third ports disposed adjacent the first housing port, the second port of the first passageway disposed adjacent the second housing port and the fourth port of the second passageway disposed adjacent the third housing port,
wherein the first and second passageways converge at their respective first and third ports to form an edge adjacent the first housing port,
wherein the fluid cut sensor is disposed along the horizontal flow passageway.

8. The valve of claim 7, wherein the edge is substantially horizontal.

9. The valve of claim 7, further comprising a valve seat within the valve housing, the valve seat defining an elongated bore in which the moveable element is disposed.

10. The valve of claim 9, wherein the edge is substantially horizontal.

11. The valve of claim 9, wherein the valve element is an elongated cylinder slidingly translatable within the elongated bore.

12. The valve of claim 9, wherein the valve element is a block slidingly translatable within the elongated bore.

13. The valve of claim 7, further comprising a valve seat within the valve housing, the valve seat defining a substantially horizontal bore in which the moveable element is disposed, wherein the moveable element is defined along an axis that is substantially horizontal.

14. The valve of claim 13, wherein the bore is cylindrical in cross section and the valve element is an elongated cylinder.

15. The valve of claim 14, wherein the cylinder is rotatably mounted in the bore.

16. The valve of claim 14, wherein the cylinder is linearly translatable within the bore.

17. The valve of claim 13, wherein the bore is cylindrical in cross section and the valve element is a circular disk.

18. The valve of claim 17, wherein the disk is rotatably mounted in the bore.

19. The valve of claim 7, further comprising a valve seat, wherein the valve element is a rotatable disk vertically mounted in the valve seat.

20. The valve of claim 7, further comprising a valve seat within the valve housing, the valve seat defining an elongated bore in which the moveable element is disposed, wherein the moveable element is defined along an axis that is substantially horizontal.

* * * * *